United States Patent [19]

Rickman

[11] Patent Number: 4,946,026
[45] Date of Patent: Aug. 7, 1990

[54] RESIDUE REMOVAL SYSTEM FOR A CONVEYOR ASSEMBLY

[75] Inventor: William S. Rickman, Leucadia, Calif.

[73] Assignee: Ogden Environmental Services, Inc., San Diego, Calif.

[21] Appl. No.: 399,322

[22] Filed: Aug. 28, 1989

[51] Int. Cl.⁵ .............................................. B65G 45/10
[52] U.S. Cl. .................................... 198/494; 198/499; 198/716; 198/734
[58] Field of Search ........................ 198/494, 497–499, 198/715, 716, 731, 733, 734

[56] References Cited

U.S. PATENT DOCUMENTS

| | | | |
|---|---|---|---|
| 2,094,789 | 10/1937 | Gellatly | 198/171 |
| 2,287,378 | 6/1942 | Hapman | 198/171 |
| 2,667,263 | 1/1954 | Bigler et al. | 198/171 |
| 2,753,980 | 7/1956 | Ballard | 198/494 |
| 2,767,825 | 10/1956 | Welch | 198/172 |
| 3,516,535 | 6/1970 | Patz | 198/498 |
| 3,523,605 | 8/1970 | McClelland, Jr. et al. | 198/171 |
| 3,750,861 | 8/1973 | Holtsclaw et al. | 198/159 |
| 4,148,392 | 4/1979 | Larson et al. | 198/498 |
| 4,770,289 | 9/1988 | Ganz | 198/734 |

FOREIGN PATENT DOCUMENTS 2141321 8/1971 Fed. Rep. of Germany .
485048 12/1975 U.S.S.R. .

*Primary Examiner*—Joseph E. Valenza
*Attorney, Agent, or Firm*—Fitch, Even, Tabin & Flannery

[57] ABSTRACT

A conveyor flight for a conveyor assembly has an overlayment of a non-elastomeric flexible member on its front or loadbearing surface, which flexible member has a memory such that it recovers to its unloaded reference condition, thus assisting in discharge through an underlying chute or port of the materials transported by the conveyor and avoiding recycling material through the conveyor assembly. The flexible member recovery dislodges adherent material, such as compactible earth, from the conveyor flights. A cleaner assembly may optionally be provided downstream of the discharge port to insert a cleaner blade in proximity to the conveyor flight front surface to dislodge any particularly adherent residual materials that might still be attached to the front surface of the flexible member.

19 Claims, 2 Drawing Sheets

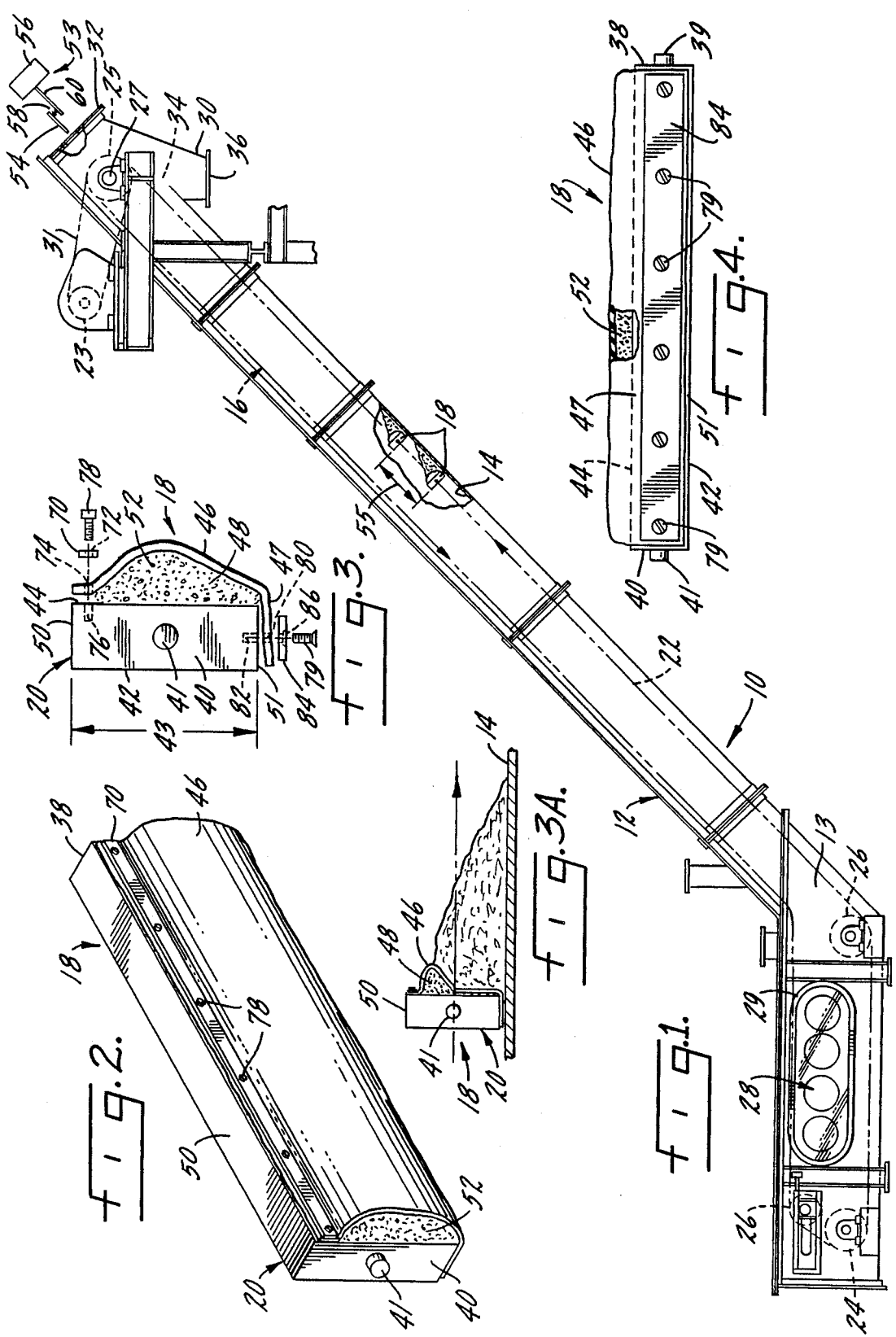

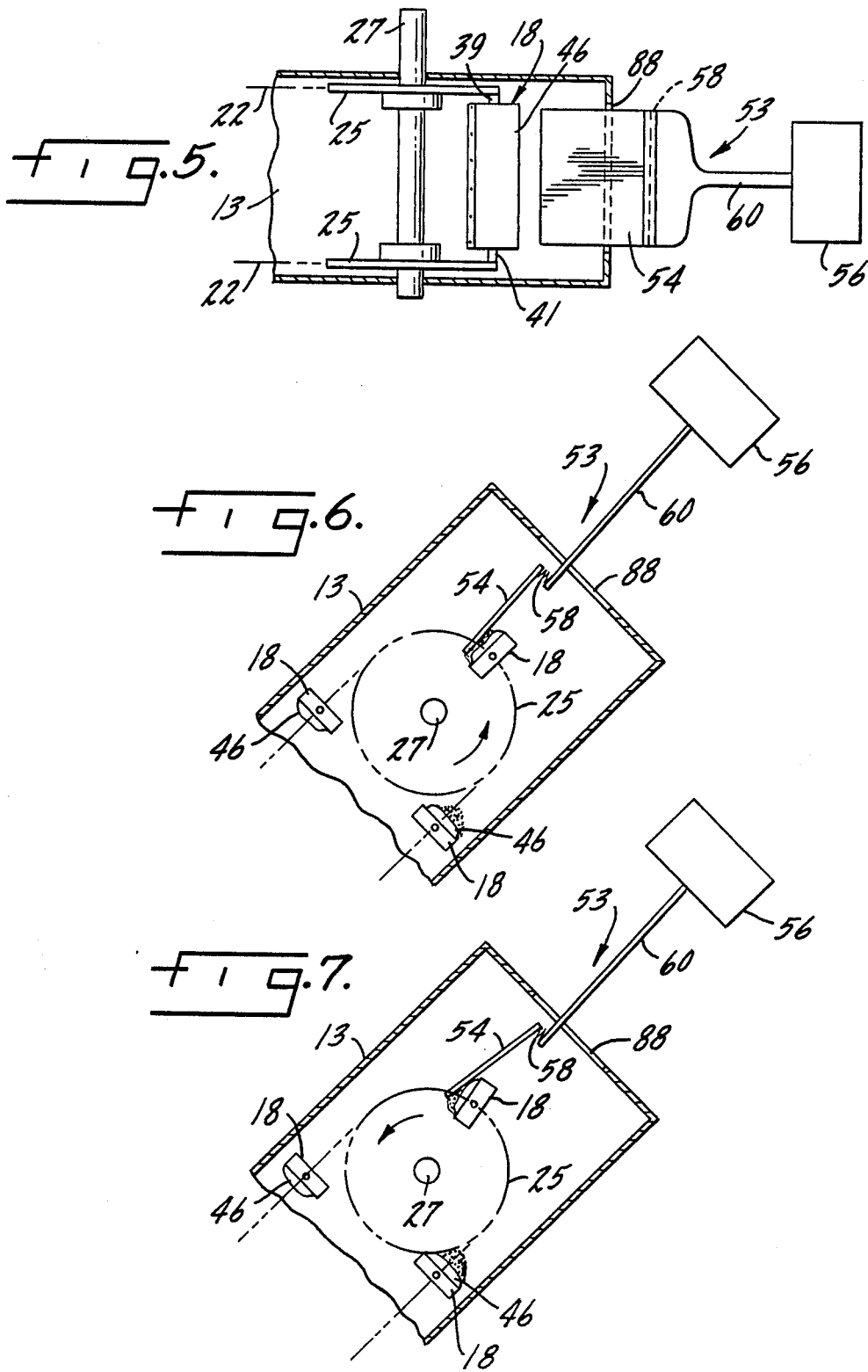

RESIDUE REMOVAL SYSTEM FOR A CONVEYOR ASSEMBLY

BACKGROUND OF THE INVENTION

The present invention relates to a conveyor system and more specifically to a residue removal system for drag-link conveyor flights.

Conveyor systems for transporting goods and materials include continuous drive belt apparatus coupled to a carrying means such as a plate or spring-like structure. The hinged plates or conveyor flights may be driven by the chain or belt apparatus past a sprocket and/or drive assembly. The plates in a conveyor system are generally aligned between parallel drive belts or may be centrally coupled to a single drive means, and pockets are created between successive plates for the retention of material being transferred. The belt and plate assembly may, for example, be operable in a vertically inclined transfer direction, such as along a ramp, or in a horizontal direction within an enclosure, such as a tube. The goods or materials transferred by the conveyor systems are retained in the space or pocket between such pairs of conveyor flights, being moved along the ramp or enclosure from an input point or port to a discharge point or exit port.

The structural variations for individual flights of a conveyor apparatus include: a plate extending between and coupled to belt links; a single chain driven plate with a flexible link between the conveyor chain and the flight; a bendable plate or shoe in the flight which is coupled to the drive means; shoes in each flight which are made of a flexible spring material; and, a structure where the shoe of each flight may twist or pivot about the driving chain. Each of these several structures are designed and operable to accommodate specific transport and transfer problems associated with particular conveyed materials. As shown in U.S. Pat. Nos. 2,094,789 and 2,287,378, flexible or pivotable shoes are particularly applicable to transport loads which contain oversized items or materials which may lodge in the conveyor, allowing the conveyor flights to deflect and return to their original positions after deflecting and passing an obstruction.

Bulk materials, as well as particulate matter are often transferred by conveyor apparatus. Bulk materials may vary in density and compactibility, and compaction thereof may pose a significant problem to continuous or efficient transfer operations. Therefore, apparatus and arrangements are desired to positively effect complete discharge of material which may become compacted against the conveyor flight surface within each successive conveyor pocket.

SUMMARY OF THE INVENTION

The present invention provides a structure for discharging compacted and adherent materials from conveyor flight surfaces. Adherence of material to the face of a conveyor flight reduces the total material transfer capacity of a conveyor system, as the adhered material is not discharged but recycles through the system. The present invention provides each flight of the conveyor system with a flexible, noncompressible, non-elastomeric facing element, which element flexes and puckers, but is not compressed during the transfer and compaction stage; it is highly resilient, having a memory which causes it to recover and return to its reference or unloaded state as soon as the force deforming it is removed, thereby discharging the entire load, including compacted material, borne by each flight through an underlying discharge opening. In other words, once the load on the facing element is reduced because of the pull of gravity downward toward an open chute, the memory of the facing element or member causes it to return to its unstressed state, discharging the material in the pocket in front of each flight through the discharge chute. Optionally, a compressible constituent is used to fill the gap or cavity between the face of the conveyor flight and the facing element to prevent any of the transferred material from infiltrating between the flexible member and the conveyor flight face, which compressible constituent may provide an added expansive force for discharging the material in front of the conveyor flight.

As an added feature a cleaning blade can be positioned downstream of the discharge chute to interpose itself in the conveyor pockets in close proximity to the flight face to dislodge any adhering material not earlier removed from the conveyor flight. Thus an individual structure, that is the conveyor flight laminate structure, is operable with a secondary apparatus within a conveyor assembly to insure total removal of transferred material from each conveyor pocket at the discharge region, thus increasing overall efficiency of a conveyor system where adherence is a significant problem.

BRIEF DESCRIPTION OF THE DRAWINGS

In the Figures of the Drawings, like reference numerals identify like components, and in the drawings:

FIG. 1 is an elevational view of a conveyor assembly;

FIG. 2 is a perspective view of a conveyor flight;

FIG. 3 is an exploded side view of a conveyor flight laminate assembly;

FIG. 3A is an enlarged fragmentary view of a conveyor flight as seen in FIG. 1, transferring material up the conveyor ramp;

FIG. 4 is a bottom view in partial section of the conveyor flight in FIG. 3;

FIG. 5 is a diagrammatic illustration of the cleaner assembly;

FIG. 6 illustrates the cleaner blade of FIG. 1 in its extended or operating position; and FIG. 7 illustrates the cleaner blade displacement after contact with a flight of the conveyor assembly.

DETAILED DESCRIPTION OF THE PREFERRED EMBODIMENT

Conveyor systems are utilized for the transfer and transport of packages, parts, particulate matter and bulk materials, as well as numerous other goods. Conveyor systems include continuous belt systems and mechanically driven shoes or flights. The latter mechanically operated flights are utilized for transferring at least the above-noted types of products, and they are operated in varying environments, including coke plants, farms and warehouses. The structure may have a belt or articulated chain coupled to either side of a rectangular plate to move the plate and transfer the goods contacting the plate. There are numerous variations of this type of conveyor structure which include: single chain or double chain drive systems; conveyor systems that operate horizontally or along sloped ramps; enclosed systems operable with chutes and secondary transfer means such as hoppers; and, particular conveyor flight structures operable to accommodate the particular materials or products being transferred. As an example, specially designed conveyor systems are provided to overcome problems such as oversize particulates which may wedge between a flight and the conveyor housing to inhibit continuous operation or inducing fracture of the conveyor flight.

Compactible materials transferred by conveyors tend to compact against the transporting surface during this transfer. In the case of a drag link conveyor, the material compacts against the front or contacting surface of the conveyor flights, and consequently all the material moved from the inlet port or chute may not be discharged at the exit chute. Instead material may continue to adhere to the conveyor flight and be recycled through the conveyor system. This added burden increases the load on the driving motor or engine, reduces the volume available for material transfer by the conveyor flight and thus reduces the efficiency of the conveyor system. Therefore, it is highly desirable to discharge all of the transported material at an underlying discharge chute.

A conveyor assembly 10 is illustrated in FIG. 1 in a diagrammatic representation as a drag link conveyor. In this arrangement, assembly 10 has a housing 12 with a lower surface or ramp 14 in a transfer chamber or enclosure 13. Conveyor 16 of assembly 10 has a plurality of conveyor flights 18, and each flight 18 (shown in FIGS. 2, 3 and 3a) includes a rectangular plate or block 20 coupled to and driven by a driving means 22, such as a belt or chain drive operable over driving sprockets or sheaves 24, 25 and idler sprockets or sheaves 26. A motor 23 is drivingly coupled to sprocket 25 with drive means 31, such as chain drives or drive belts, to drive the conveyor system. In this illustration, sprocket 26 may also be a driving sprocket, but the number and combination of driving and idle sprockets is a design choice. An input device or feeding means 28, which is shown as a quad-screw infeed arrangement, is positioned at input location or port 29 for supplying the materials to be transferred; however, other equivalent feeders may be used. Discharge chute 30 with passage 36 is provided at upper or discharge end 32 of ramp 14, which end is furthest from feeding means 28. Chute 30 underlies a discharge port 34 at the upper end 32 of ramp 14.

The conveyor flights 18 are connected to driving belts 22 at their lateral ends 38 and 40 via coupling means or hubs 39 and 41, respectively, which are noted in FIGS. 2-5. Each conveyor flight 18 has a rear face 42, a or cellulose. The displacement of the flexible member 46 in the reference position from front surface 44 and compressible constituent 52 in region 48 is shown in FIG. 3 and in partial section in FIG. 4. The compactible material being transferred and the force of its frictional drag along the ramp 14 has a tendency to compress facing member 46 against front surface 44 or resilient material 52, which maintains some separation distance between front surface 44 and facing member 46, as best seen in FIG. 3A as an example.

As shown in FIGS. 2-4, the preferred embodiment of conveyor flight 18 has a front surface 44 and a rear surface 42. Flight 18 is a generally rectangular plate or block 20 with an upper edge 50 and a lower edge 51. As shown in exploded view in FIG. 3, the facing member 46 is mounted in front of or overlaid on, but does not conform to, front surface 44 and is not secured at side edges 38, 40 of rectangular plate or block 20.

Facing member 46 is secured at front surface 44 near its top edge 50 by a top hold-down strip 70. Hold down strip 70 includes a plurality of through-bores or holes 72, which align with holes or passageways 74 along the top edge of facing member 46. Rectangular plate 20 has a plurality of blind-hole bores or threaded holes 76 with which the passageways 74 of strip 70 align to receive cap screws or other securing means 78 extending through holes 72 and passageways 74 to secure flexible facing member 46 along the upper edge of front surface 44.

Bottom edge 47 of flexible facing member 46 includes a plurality of passageways 80, which align with a second row of threaded blind-hole bores 82 along bottom edge 51 of rectangular plate 20. A plurality of apertures 86 of a lower hold-down strip 84 accommodate the heads of screws or securing means 79. Hold-down strip 84 contacts lower edge 47 of flexible facing member 46, and apertures 86 are aligned with passages 80 and blind-hole bores 82 to receive securing means 79 to secure the flexible facing member 46 to bottom edge 51 of rectangular plate or central support element 20. As show in these Figures, a compressible constituent 52 may optionally be inserted in region 48 to generally fill gap 48 to prevent infiltrating material from packing into this region. It is appreciated that securing means 78, 79 may be any of screws, rivets or other connectors, and that blind-hole bores 76, 82 may be threaded. In addition, apertures 72 and 86 of hold-down strips 70, 84, respectively, may be counter-bored to provide a recess for any extending screw or rivet heads to thereby provide a smooth surface for hold-down strips 70, 84. Hold-down strip 84 in the preferred embodiment operates as a wear surface as it contacts ramp 14.

The overall assembly may further include a cleaning device 53 to mechanically dislodge any adherent transferred material in conveyor flights 18 carried past discharge opening 34. The cleaning device 53, shown in FIGS. 1 and 5 at a reference position, has a cleaner blade 54 connected to a drive means 56 by a hinge 58 and connecting rod 60. The cleaner blade assembly 53 is generally mounted in proximity to upper sprocket 25 to contact or extend into the spaces or pockets 55 between flights 18 to dislodge any residual transferred material. Cleaner blade 54 is connected to connecting means 60 at hinge 58, which is a spring-hinge that allows displacement of the cleaner blade 54 when, or if, it is contacted by any of the plurality of conveyor flights 18. Potential displacement of blade 54 is illustrated in FIG. 7, where the flight 18 has contacted blade 54 and displaced it from its extended position shown in FIG. 6.

Drive means 56 is operable either electrically or mechanically to move cleaner blade 54 into the conveyor flight pockets 55 to dislodge residue material adhering to front surface 44 of flexible member 46. The movement or motion of blade 54 may be actuated by suitable coupling to the conveyor drive apparatus, either electrically or mechanically, or the reciprocating motion of blade 54 may be operable in a periodic fashion, which is independent of and not synchronized to the conveyor movement The elected method of actuation, whether or not in synchronization, is a design choice electable by the user from among means known in the art.

In FIG. 1, cleaning device 53 is illustrated in a side view in the reference position and blade 54 is retracted from pockets 55 between the conveyor flights 18. In FIGS. 6 and 7, the conveyor flights 18 are illustrated with compacted material adhering to flexible facing member 46 downstream of discharge chute 30. As conveyor 16 traverses pulley or sprocket 25, conveyor flights 18 pass a cleaner portal 88, as shown in FIGS. 5-7, through which the arm 60 protrudes. As noted above, actuating means 56 extends arm 60 to insert cleaner blade 54 in close proximity to the flexible facing member 46 of each conveyor flight 18 as it passes portal 88. The blade 54 at the extended end of arm 60 will contact and dislodge any adherent material that did not earlier fall through the discharge chute 34; then actuating means 56 may quickly withdraw cleaner blade 54 and arm 60 from pocket 55 before the blade 54 contacts conveyor flight 18. However, contact between any of conveyor flights 18 and cleaner blade 54 is fully acceptable and merely results in the blade 54 deflecting at the hinge 58, as shown in FIG. 7, which prevents any damage to either the conveyor flights 18 or to the blade 54 and may be helpful to assure complete removal of adherent material. Cleaner blade 54 is approximately the width of conveyor flight 18, as seen in FIG. 5, to ensure relatively complete removal of all adherent material from the conveyor flights 18 returning to inlet port and feeding mechanism 28.

Operation of the residue removal system thus clearly improves the efficiency or rate of material transfer of the conveyor 10 by assuring the discharge of the transferred material at discharge port 34 and avoiding its being recycled through the conveyor circuit. In this operation, compactible material to be transferred is introduced to the conveyor assembly 10 at inlet port 29 by feeding means 28. The material falls into and accumulates in each pocket 55 between successive conveyor flights 18 of conveyor assembly 10 and is pushed up ramp 14 toward discharge port 34. As each flight 18 initiates contact with the material at inlet port 29, the material pushes against the facing member 46 toward the front surface 44 of the flight 18 (cf. FIG. 3a). As the material being transferred is pushed up the ramp, it tends to compact and would tend to adhere to surface 44 of the flight 18, which is especially true of moist earth or soil. Adherence of transferred material in the conveyor circuit would recycle the residue material through the conveyor system, reducing the volume of material transferred per conveyor flight and thus reducing conveyor efficiency. However, the application of flexible, non-elastomeric member 46 onto surface 44 provides a positive deterrent to such recycling of earth or the like being transferred, because once the frictional force resulting from travel along ramp 14 is removed at discharge passage 34, flexible facing member 46 pushes back to return to its original unstressed reference orientation as shown generally in FIG. 3, which usually results in the removal of any residual compacted material. The ability of flexible facing member 46 to return to the reference position is an inherent characteristic, which does not require outside forces to restore this position.

In an alternative embodiment, a compressible material 52, such as polymeric foam is applied to surface 44 to essentially fill void 48. The flexible facing member 46 is secured to rectangular plate 20 adjacent the edge of its upper surface 50 and along its lower surface 51, generally covering the compressible constituent 52, which prevents material being transferred from infiltrating into void 48. The compressed constituent 52 may expand at the time of load removal at discharge port 34 and provide an added force to return the flexible facing member 46 to its unstressed orientation, thus dislodging residue from the conveyor flight 18.

As each flight 18 traverses discharge port 34 there remains the possibility for adherence of moist material being transferred to the surface of the facing member 46, and therefore, a means for mechanically dislodging any retained material is provided by cleaner blade 54. Cleaner blade 54 is extended into the pockets 55 between the conveyor flights 18 in proximity to surface 44 to mechanically remove any retained or compacted goods. Blade 54 is moved into contacting position through the extension of arm 60 by driving means 56. The blade 54 reciprocates and is coupled to a connecting rod 60 by a spring hinge 58, which allows pivotal displacement from rod 60 without damage to any of rod 60, rectangular plate 20 or blade 54 from contact with plate 20. The cleaning and dislodging apparatus of flights 18 and cleaning blade 54 provides an easily assembled, economical and efficient assembly to improve the efficiency of a conveyor system.

While only a specific embodiment of the invention has been described and shown, it is apparent that various alternatives and modifications can be made thereto. It is therefore, the intention in the appended claims to cover all such modifications and alternatives as may fall within the scope of the invention.

What is claimed is:

1. In a conveyor assembly for transporting compactible materials, said assembly having an inlet port, a discharge port, a plurality of conveyor flights and a means for driving said flights, each of said conveyor flights being drivingly coupled to said driving means and comprising a plate element having a front surface, a top edge and a bottom edge, a flexible member secured to said plate element and displaced from said front surface at a reference position, which flexible member is non-elastomeric, said front surface and said flexible member defining a gap therebetween at said reference position, which flexible member is resistant to displacement against the overall front surface of said support element by the force from transfer of said compactible material, said flexible member inherently recovers to said reference position, when the transfer force is removed, to discharge said transported material from the conveyor assembly by dislodging adherent material from said conveyor flight.

2. A conveyor flight as claimed in claim 1 further comprising means for securing, said flexible member secured to said conveyor flight at said top edge and said bottom edge by said securing means.

3. A conveyor flight as claimed in claim 1 wherein said flexible member is a synthetic rubber.

4. A conveyor flight as claimed in claim 1 further comprising a resilient constituent positioned in said region between said flexible member and said plate front surface.

5. A conveyor flight as claimed in claim 4 wherein said resilient constituent is an expanded foam adherent to said plate front surface.

6. A conveyor flight as claimed in claim 1 wherein said flexible member is displaced by said compactible material and has a memory such that it recovers to said reference position when said compactible material is discharged at said discharge port.

7. A conveyor flight as claimed in claim 2 wherein said plate element defines a plurality of bores on said front surface in proximity to said top edge and at said bottom edge; said flexible member has an upper edge and a lower edge and defines a plurality of passages at each of said upper edge and lower edge; said securing means comprising a top hold-down strip with a plurality of through-bores alignable with said plate member top edge bores, a bottom hold-down strip with a plurality of through-bores alignable with said plate member bottom edge bores, and a plurality of fasteners, said flexible member positioned at said top edge and bottom edge between said top hold-down strip and bottom hold-down strip, respectively, each having its respective passages aligned with said respective bores and through-bores, said fasteners extending through said through-bores passages and mating in said plate element bores to secure said flexible member to said plate element.

8. In a conveyor assembly for transporting compactible material, said assembly including a housing with an inlet port, a discharge port and a lower ramp, a plurality of conveyor flights and a means for driving wherein each of said conveyor flights has a means for discharging residual compacted material on said conveyor flight, said conveyor flight comprising:

a plate element having a front surface, a top edge, a bottom edge, a first side and a second side;

each of said flights drivingly coupled to said means for driving at each of said first and second sides; means for securing; and, a nonconforming, non-elastomeric, flexible member generally covering and extending from said front surface in a reference position, said flexible member secured to said plate element by said securing means, which flexible member has an inherent memory to recover to said reference position to dislodge residual, adherent material after discharge of said compactible material at said discharge port.

9. A conveyor flight as claimed in claim 8 wherein said flexible member and said plate element front surface cooperate to define a gap therebetween.

10. A conveyor flight as claimed in claim 9 further comprising a resilient constituent positioned in said gap.

11. A conveyor flight as claimed in claim 10 wherein said resilient constituent is an expanded foam adherent to said plate element front surface.

12. A conveyor flight as claimed in claim 10 wherein said resilient constituent is an expanded and compressible bladder with a gas volume therein.

13. A conveyor flight as claimed in claim 8 wherein said securing means comprises an upper hold-down strip, a lower hold-down strip and a plurality of screw means; each of said upper and lower hold-down strips defining a plurality of apertures;

said plate element defining a plurality of threaded bores along said plate element front surface at said top edge and along said bottom edge;

said flexible member having an upper edge and a lower edge and defining a plurality of passages at said upper edge and lower edge;

said upper hold-down strip apertures alignable with said upper edge flexible member passages and plate element bores, which flexible member at said upper edge is interposed between said hold-down strip and plate element;

a screw means for each of said upper hold-down strip apertures and extending through each of said apertures and passages to mate in said plate element bores and secure said flexible member to said upper edge;

said lower hold-down strip apertures alignable with said lower edge flexible member passages and support member bores, which flexible member at said bottom edge is interposed between said lower strip and said bottom edge; and, a screw means for each of said lower hold-down strip apertures extending through each of the apertures and passages to mate in said bores and secure said flexible member and hold-down strip to said lower edge, which lower hold-down strip is operable as a spacer and wear plate between said conveyor flight plate element and said housing lower ramp.

14. A conveyor flight as claimed in claim 8 further comprising a mounting and securing hub at each of said first and second sides;

said driving means being a dual chain drive having a first chain and a second chain operable over sprocket means, each of said chains coupled to said conveyor flights at one of said first and second side securing hubs.

15. In a conveyor assembly as claimed in claim 8, wherein each adjacent pair of said conveyor flights cooperating to define a material-transport pocket therebetween, said assembly further comprising a cleaner blade assembly, said cleaner blade assembly having a cleaner blade operable to extend into said pockets to dislodge adherent compactible material from said flexible member.

16. In a conveyor assembly as claimed in claim 15, said cleaner blade assembly further comprising a means for driving, an arm and a hinge means, said cleaner blade connected to said arm by said hinge means, which arm and blade are displaced from said conveyor flight pockets at a reference position and operable between said reference position and said pockets by said driving means.

17. In a conveyor assembly as claimed in claim 16 wherein said hinge means is a spring hinge.

18. In a conveyor assembly as claimed in claim 17, said blade coupled to said arm at said spring hinge is pivotable at said hinge.

19. In a conveyor assembly as claimed in claim 16 wherein said driving means is synchronized with said conveyor flights to provide said cleaner blade in said pockets and noncontacting with said flexible material.

* * * * *